United States Patent
Klein et al.

(10) Patent No.: US 6,359,344 B1
(45) Date of Patent: Mar. 19, 2002

(54) ELECTRIC GENERATING DOMESTIC IMPLEMENT

(75) Inventors: Jeffrey R. Klein, Mentor; Edward A. Enyedy, Eastlake, both of OH (US)

(73) Assignee: Lincoln Global, Inc., Monterey Park, CA (US)

( * ) Notice: Subject to any disclaimer, the term of this patent is extended or adjusted under 35 U.S.C. 154(b) by 39 days.

(21) Appl. No.: 09/660,416

(22) Filed: Sep. 12, 2000

(51) Int. Cl.⁷ .............................................. H02K 7/00
(52) U.S. Cl. .......................... 290/1 A; 290/1 R; 322/1
(58) Field of Search .......................... 290/1 R, 1 A, 290/1 B, 2; 322/1

(56) References Cited

U.S. PATENT DOCUMENTS

| | | | |
|---|---|---|---|
| 4,446,679 A | | 5/1984 | Thomas .............................. 56/2 |
| 4,539,483 A | * | 9/1985 | Freeny, Jr. ...................... 290/1 R |
| 4,597,203 A | | 7/1986 | Middleton ...................... 37/241 |
| 4,720,638 A | * | 1/1988 | Vollbrecht ................. 290/38 R |
| 5,965,999 A | * | 10/1999 | Frank .......................... 290/1 B |

* cited by examiner

Primary Examiner—Nicholas Ponomarenko
(74) Attorney, Agent, or Firm—Vickers, Daniels & Young (57) ABSTRACT

A portable implement for providing a source of electrical energy, where the implement has an electric generator with a drive shaft rotatable about a shaft axis and at least one set of electrical output leads, a support housing with a lower ground engaging base, an upper support plate with a central access opening, a bracket in the housing to mount the generator with the shaft axis extending generally vertically through the access opening and a platform on the housing to fixedly attach a standard lawn mower with a cutter blade rotatable about a blade axis onto the housing with the blade axis extending generally parallel to and generally aligned with the shaft axis. A universal shaft coupling carried by the drive shaft and extending through the access opening, which coupling has a lower section connected to the drive shaft for rotation about the shaft axis and an upper section with a nest to receive the cutter for rotation of the upper section about the blade axis.

31 Claims, 10 Drawing Sheets

ELECTRIC GENERATING DOMESTIC IMPLEMENT

The present invention relates to the field of domestic implements usable by households for convenience and more particularly to an electric generating domestic implement for providing auxiliary alternating current electric energy for household and other domestic use.

INCORPORATION BY REFERENCE

The invention is directed to an electric generator implement powered by a standard lawn mower. Thomas U.S. Pat. No. 4,446,679 shows a standard lawn mower driving a tiller or snow blower. An arrangement for strapping a standard lawn mower onto the top of an implement being driven by the lawn mower is disclosed. For this reason, and as general background information, this patent is incorporated by reference. In a like manner, Middleton U.S. Pat. No. 4,597,203 is incorporated by reference herein as background information.

BACKGROUND OF INVENTION

In recent times, there has been an increased demand for domestic electric generators to provide alternating current for lighting, cooking and appliances, especially during interruptions in normal electric circuits. Also, there is a demand for portable generators to provide electrical service in diverse locations around the home. A large variety of domestic generators are on the market. Such units use gasoline engines to drive electrical generators that provide 110 VAC and possibly 220 VAC. Such domestic electric generators are very seldom used; therefore, the units are relatively expensive when compared to the actual time they are used. Such household generators include gasoline engines, thus adding drastically to their bulkiness, weight, cost and storability. Consequently, there is a market need for a domestic or household electric generator implement that is low cost, requires very little storage space and does not present difficulty associated with storing gasoline driven implements.

THE INVENTION

The present invention is directed toward a domestic implement for providing a source of alternating current to be used during periods of power interruption, or in remote areas not serviced by electric power. The domestic implement contemplated by the present invention is an energy source powered by a standard gasoline driven lawn mower. The lawn mower, in accordance with the invention, is not modified. The use on an unmodified standard gasoline driven lawn mower to drive a domestic electric generator provides two distinct domestic implements at a lower cost, reduced storage space, and easier storability.

In accordance with the present invention, there is provided a portable implement that can be easily moved and generates electric energy for domestic use. This implement includes an electric generator having a drive shaft rotatable about a shaft axis and at least one set of electrical output leads for AC current. A support housing of the implement includes a lower ground engaging base, an upper support plate with a central access opening, a bracket in the housing to mount the generator with the generator shaft axis extending generally vertically up through the access opening and a platform on the housing to fixedly attach a standard gasoline driven lawn mower with a cutter blade rotatable about a blade axis. In this manner, the lawn mower is mounted on the housing with the blade axis extending generally parallel to, and generally aligned with, the shaft axis. A universal shaft coupling allowing misalignment of the two axes is carried by the generator drive shaft and extends upwardly through the access opening. The coupling of the invention has two sections. The lower section is connected to the drive shaft of the generator for rotating the shaft about its axis and the upper section includes an upwardly facing nest that receives the cutter blade for rotation of the upper section by the cutter blade about the blade axis. The universal coupling allows rotation of the blade about one axis to drive the generator about another axis. Ideally, the two axes coincide; however, practically they do not. They are laterally offset. Thus, it is necessary to provide a universal joint having at least orthogonal relative movement. In the preferred embodiment, an oldham coupling is employed whereby spaced glidable members allow rotation of one section about one axis and a second section about another axis.

In accordance with another aspect of the invention, the cowling about the lawn mower is gripped by at least four engaging bumpers that center the lawn mower blade over the generator shaft. These bumpers are adjustable in a transverse direction to accommodate a variety of domestic lawn mowers. After the bumpers are adjusted for a particular lawn mower, they are locked in position. The mower is automatically centered on the housing of the implement by merely centering the cowling with the previously fixed, upstanding adjustable bumpers.

In accordance with another aspect of the present invention, the universal joint has an upper section that is spring biased from the lower section. As the lawn mower is mounted on the housing of the implement, the standard blade of the lawn mower pushes the top section of the coupling toward the bottom section or lower section of the coupling. By rotating the blade with respect to the generator, the blade ultimately drops into the nest at the top of the upper section. This nest preferably involves an elongated slot for capturing the lawn mower blade. However, two orthogonal slots could be provided in the upper section of the coupling. As an alternative, upstanding abutment elements can be provided. In accordance with one aspect of the invention, the abutment elements are tapered pins. When the lawn mower is placed over the housing of the generating implement, the blade automatically centers on the coupling for driving the coupling to, in turn, drive the generator. In this alternative embodiment of the invention, the upper section of the coupling need not be spring biased.

In accordance with another aspect of the present invention there is provided a method of driving an electric generator by its drive shaft. The generator has an upstanding coupling with an upper section provided with at least one diametrically extending blade receiving slot. This upper section is spring biased away from the lower section of the coupling in a direction of the generator drive shaft. The method involves a standard lawn mower of the type having a lower cutter blade driven by a gasoline engine. Such lawn mower is started by a pull cord when a manually operated start switch is closed. The method involves setting a lawn mower on the generator with the cutter blade engaging and pushing the upper section downward and, then, pulling the pull cord at least once while the start switch is opened so the blade drops into the slot. Thereafter, the start switch is closed and the cord is pulled to start the engine for driving the generator.

The primary object of the present invention is the provision of a portable domestic generator driven by a standard lawn mower without modifications to the mower.

Yet another object of the present invention is the provision of a portable domestic generator, as defined above, which is inexpensive, can be stored in a small space and need not involve the storage of a gasoline driven engine.

Still a further object of the present invention is the provision of a portable domestic generator, as defined above, which generator accommodates a wide variety of domestic lawn mowers.

These and other objects and advantages will become apparent from the following description taken together with the accompanying drawings.

PREFERRED EMBODIMENT

Referring now to the drawings wherein the showings are for the purpose of illustrating a preferred embodiment of the invention only and not for the purpose of limiting same, FIGS. 1–4 show a domestic implement 10 constructed in accordance with the present invention to provide electrical power from outlets 12, 14. The implement comprises a support housing 20 having a ground engaging base 22, front plate 24 and back plate 26 defining a box structure of steel or aluminum. To add mobility, implement 10 is provided with a wheel bracket 30 welded to back plate 26 and having transversely spaced generally parallel webs 32, 34 on which is mounted axle 36 to carry outboard wheels 40, 42. When pivoting housing 20 rearwardly about the wheels, the housing is carried by wheels 40, 42 for moving implement 10 to the desired position for use or storage. Front plate 24 includes a handle 44 to assist in transporting or manually stabilizing implement 10. Top plate 50 of housing 20 includes a pattern of air circulating holes 52 and a central access opening 54 to allow communication into the interior of the housing. Supported on plate 50 is a generally ring-shape attachment platform 60 to be explained in more detail later. Inside housing 20 is an elongated channel shaped bracket 62 having mounting ears 64 on each :end for bolting, or otherwise affixing, the bracket onto front plate 24 and back plate 26. To provide access to the interior of bracket 62, there is a cut-away portion 66 to accommodate a standard electric generator 70 having an upstanding shaft 72. A series of bolts 74 suspend generator 70 in channel bracket 62 so shaft 72 extend upwardly to define a rotational axis b for driving generator 70. As shaft 72 is rotated, in accordance with standard technology, output leads 76 receive alternating current which, in practice, is either 110 VAC or 220 VAC. In the illustrated embodiment, two separate outputs are provided for generator 70 to provide both a 110 VAC and a 220 VAC output for outlets 12, 14. In accordance with the invention, a standard gasoline driven lawn mower 100 is merely attached on attached platform 60. Cowling 102 and wheels 110, 112, 114 and 116 of lawn mower 100 are suspended over platform 60. The wheels are supported on the frame of lawn mower 100 by cam lift legs 120. A standard manipulative handle 122 allows movement of lawn mower 100 onto platform 60. In accordance with standard practice, lawn mower 100 includes a gasoline engine 130 with a manual start switch, not shown, and a pull cord starting mechanism 132. By pulling cord 132 with the start switch closed, engine 130 rotates cutter blade 140 by shaft 142 about axis a. The blade is mounted to the shaft by bracket 144. Consequently, starting of the lawn mower causes rotation of blade 140 about shaft 142. In accordance with the present invention, the lawn mower is not modified in any fashion for use on housing 20 to drive generator 70.

Platform 60 is ring-shaped to expose circulation holes 52 and includes corner relief areas 150 defining outboard extensions 152, 154 so wheels 110–116 drop downward when cowling 102 rests primarily on outboard extensions 152, 154 of platform 60. In accordance with prior art, flexible straps, not shown, are then stretched across cowling 102 from one outboard extension 152 to the other outboard extension 154. Two or more flexible straps are used to securely affix cowling 102 to platform 60.

Figure 2:
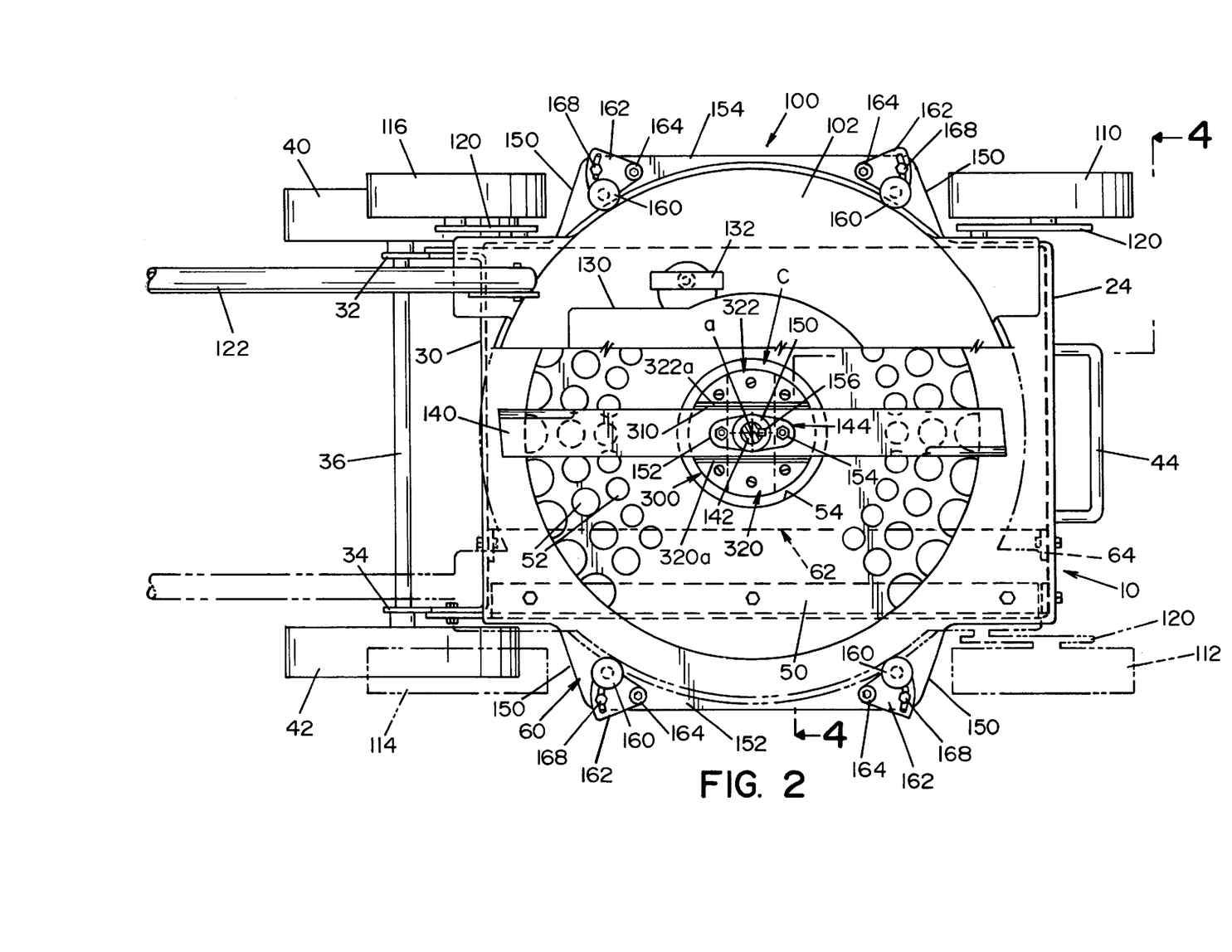
FIG. 2 is a top view partially cut away of the preferred embodiment of the present invention.
Figure 3:
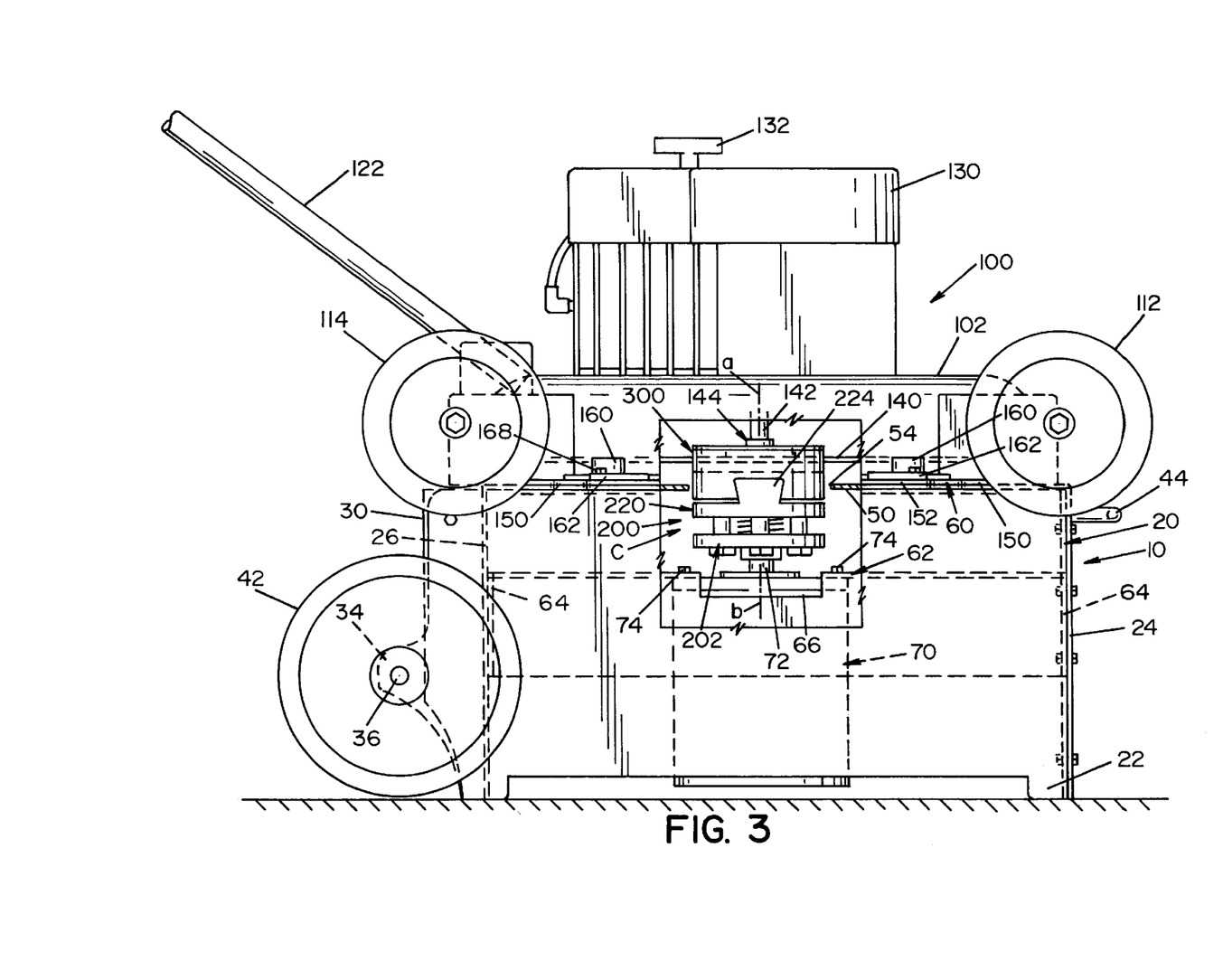
FIG. 3 is a side view, partially cut away, of the preferred embodiment of the present invention.
Figure 10:
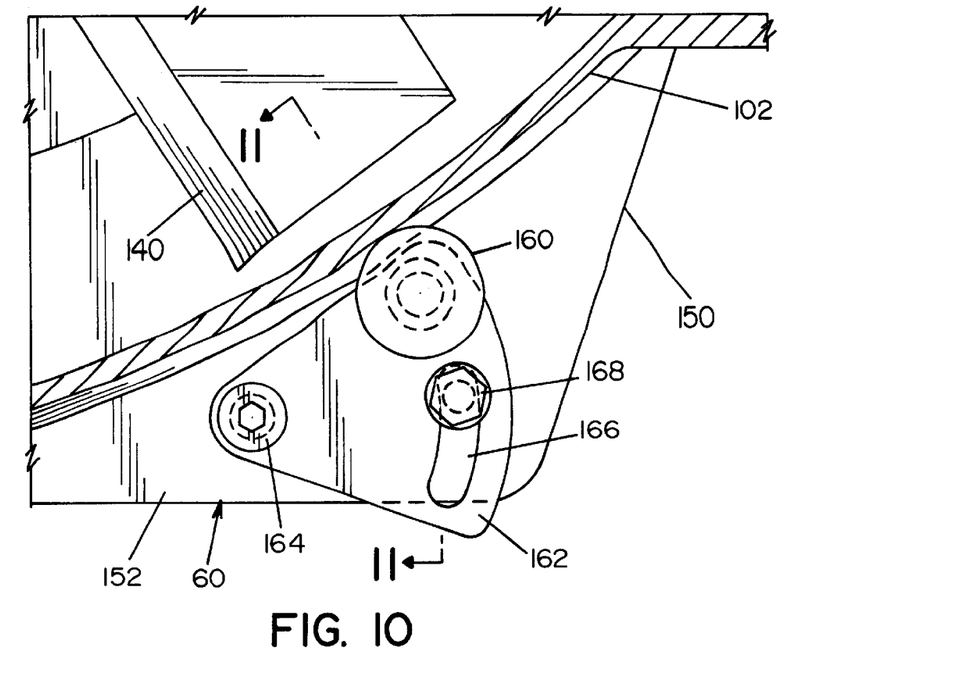
FIG. 10 is an enlarged partial view showing a single, adjustable cowling engaging bumper used in the preferred embodiment of the present invention.
Figure 11:
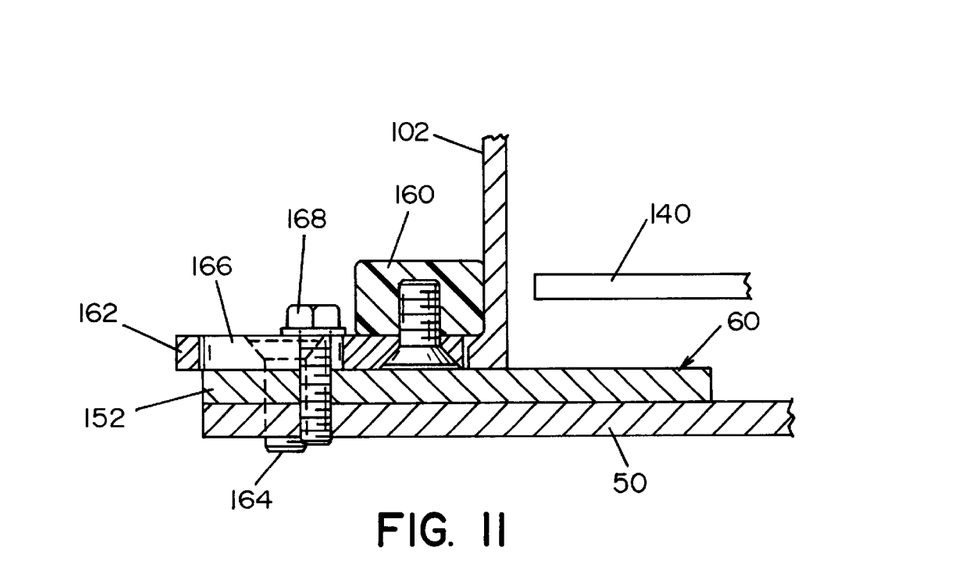
FIG. 11 is a cross-sectional view taken generally along line 11—11 of FIG. 10.

To stabilize lawn mower 100 on implement 10, a plurality of rubber cowling engaging bumpers 160 are spaced around the periphery of cowling 102. The bumpers are supported on ring-shape platform 60 as illustrated in FIG. 2. The mounting mechanism is shown in more detail in FIGS. 10 and 11. Each rubber bumper 160 is bolted onto a flat segment 162 slidable over the top of platform 60 about pivot bolt 164. Arcuate slot 166 receives a fixed lock bolt 168 so that the lateral position of bumper 160 with respect to cowling 102 is adjustable. Cowlings have different peripheral shapes. Thus, the adjustable bumpers 160 are positioned in the proper transverse location to form a cradle for cowling 102 of the particular lawn mower used for driving generator 70.

When motor 130 is started, cutter blade 140 rotates about the axis a of shaft 142. This axis is parallel to and generally aligned with the axis b of shaft 72, although there is always a slight amount of misalignment. To accommodate such misalignment, an aspect of the invention is the provision of universal coupling C allowing shaft 142 to rotate about its axis a and drive shaft 72 about its axis b to cause generation of electrical power by generator 70. Universal coupling C is shown generally in FIG. 3 and FIG. 4 where blade 140 drops into a top nest of the coupling to drive shaft 72 as the blade is rotated by motor 130.

Universal coupling C can be in the form of a variety of mechanisms. In practice, universal coupling C is a somewhat standard oldham coupling having an orthogonal slot and way joint to accommodate parallel shafts which are not actually concentric.

Details of universal coupling C, as contemplated for commercial production, are shown in FIGS. 5–9. Coupling C joins shaft 142 of blade 140 and shaft 72 of generator 70 so that axes a, b of these respective shafts can be offset when lawn mower 100 is affixed on power generating implement 10. Changes in the details of the illustrated coupling C can be made so long as the coupling allows rotation of shaft 72 by blade 140. Bracket 144 of blade 140 includes an upstanding boss 150 with a recess 150a with a closed bottom and a base plate 152. Bolts 154 attached blade 140 to bracket 144. A driving connection is provided by key 156 when shaft 142 is locked to bracket 144 by shaft lock bolt 158. To provide the driving connection for shaft 72, there is a standard key way 160. Key 156 and key way 160 drive the respective elements so rotation of blade 140 rotates shaft 72 through universal coupling C. In the preferred embodiment, the coupling includes a lower section 200 having a drive steel ring 202 with a base 204 and a key section or key 206 allowing ring 202 to drive shaft 72 through keyway 160. An upwardly facing spring receiving cavity 208 is provided on ring 202, which ring is secured onto shaft 72 by set screw 210. Movable above ring 202 is a second steel ring 220 having a cylindrical base 222 with a dovetail cross-section, diametrically extending way 224. The lower surface of ring 220 has a spring cavity 226. To reciprocally mount 220 above fixed ring 202 there is a first set of posts 230, 232 having sliding shanks 230a, 232a extending through passageways 230b, 232b in fixed drive ring 202. The opposite ends of posts 230, 232 include threaded portions received in threaded bores 230c, 232c of movable ring 220. Ring 220 is movable in a vertical direction as shanks 230a, 232a sliding in passageways 230b, 232b, respectively. A second set of posts 240, 242 are essentially the same as posts 230, 232. They include slide shanks 240a, 242a reciprocally mounted in passageways 240b, 242b in drive ring 202. Threaded bores 240c, 242c in the movable ring connect posts 240, 242 to the movable ring. This second set of posts includes upstanding guide pins 250, 252 on the ends of the posts. These pins are on the opposite sides of diametrically extending dovetail shaped way 224. Spring 260 biases ring 220 upwardly from lower fixed ring 202. Rotation of ring 220 by way 224 rotates ring 202 by slide shanks 230a, 232a, 240a and 242a. Spring 260 biases ring 220 upwardly for purposes to be explained.

Figure 1:
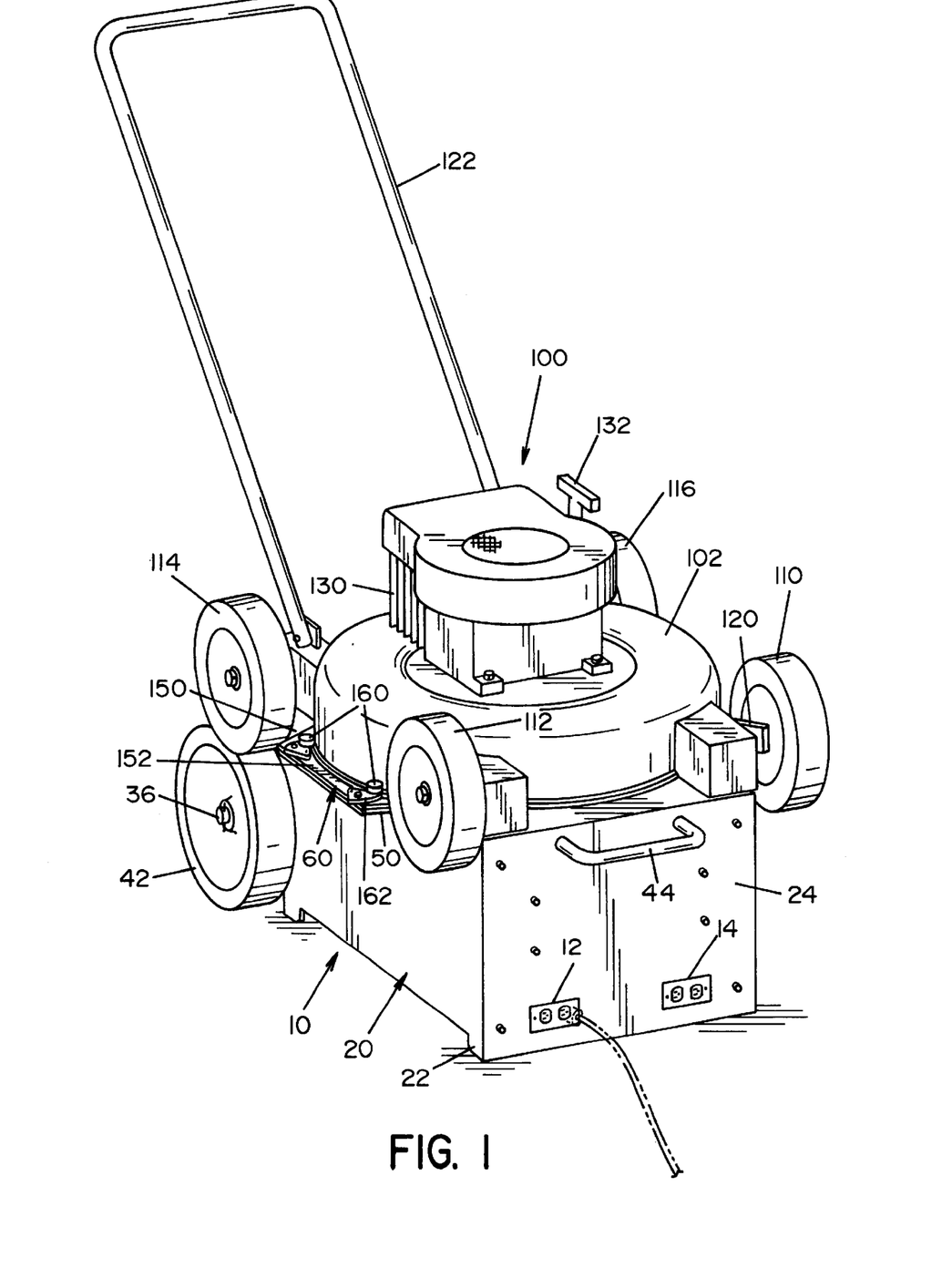
FIG. 1 is a pictorial view of the preferred embodiment of the present invention.
Figure 4:
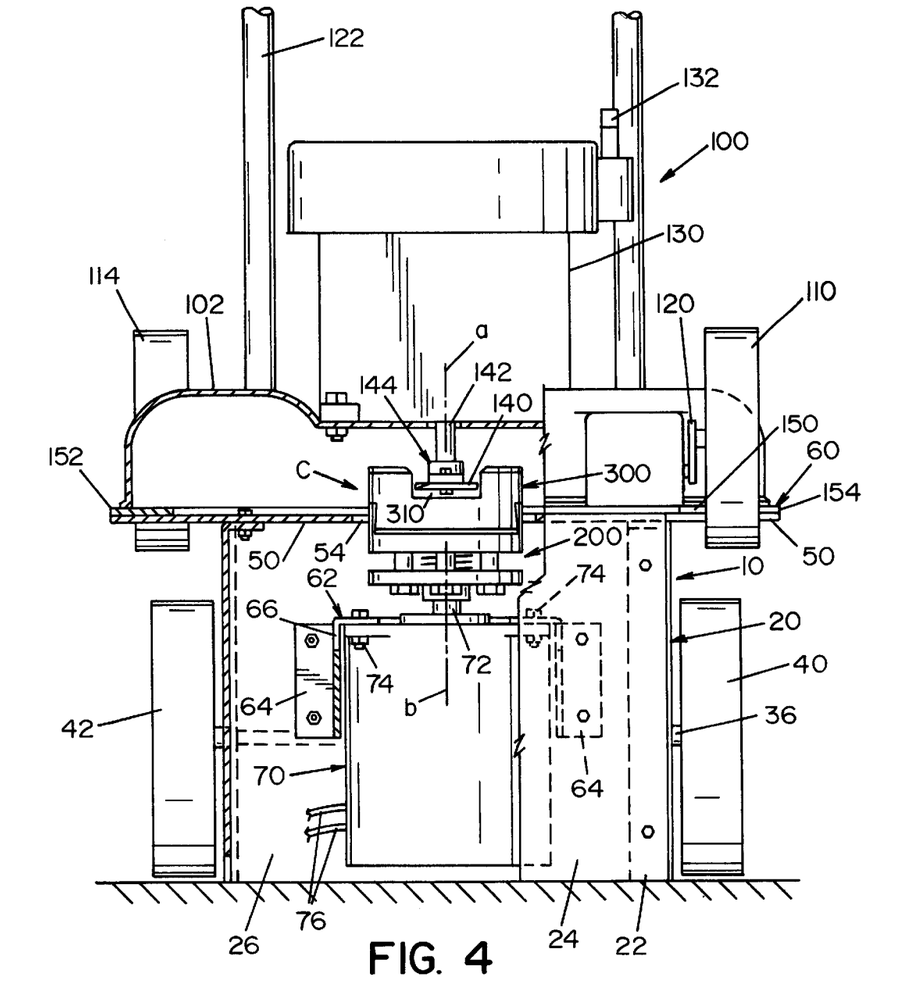
FIG. 4 is a cross sectional view taken generally along line 4—4 of FIG. 2.
Figure 5:
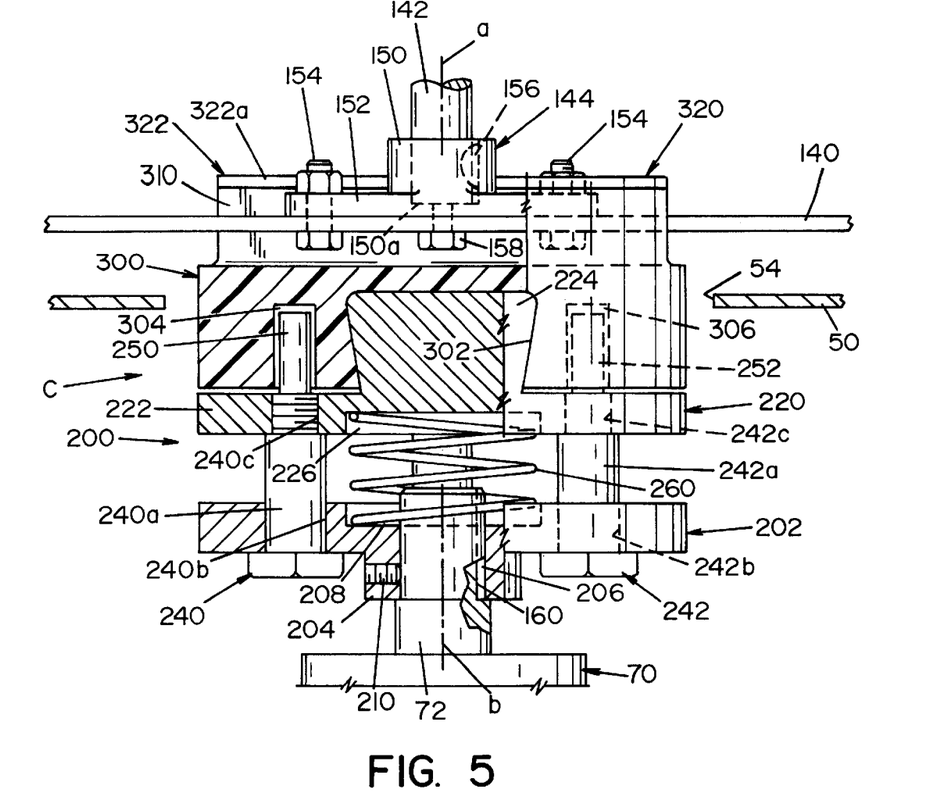
FIG. 5 is an enlarged partially cross-sectioned view of the universal coupling used in the preferred embodiment of the present invention.
Figure 6:
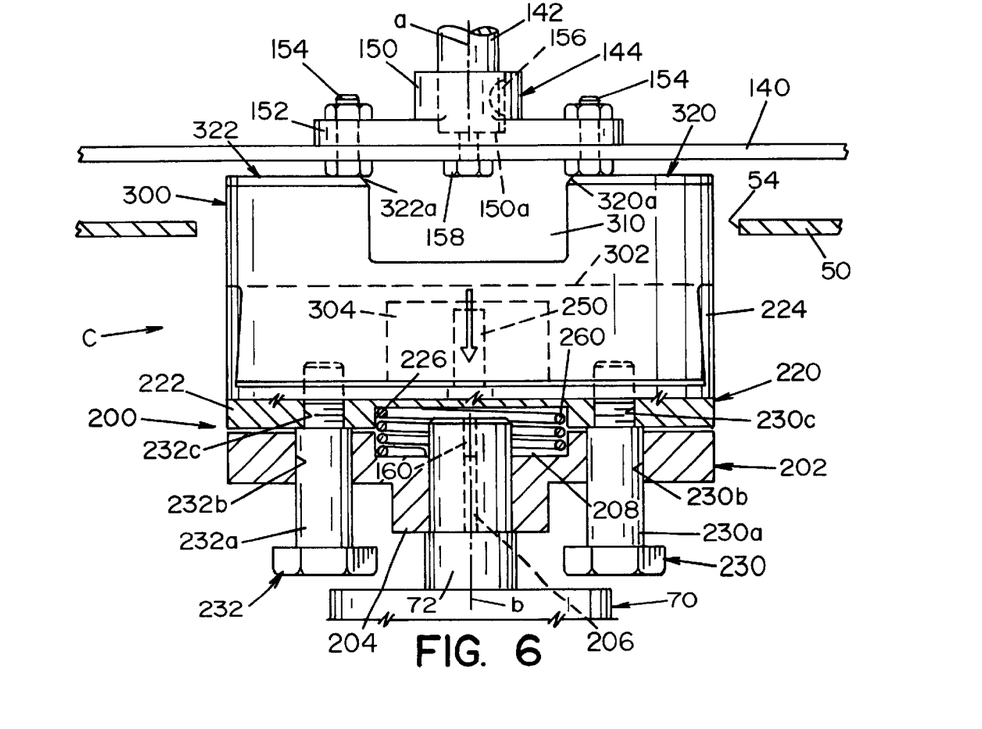
FIG. 6 is a partially cross sectioned side view of the universal coupling used in the preferred embodiment of the invention with the cutter blade in the pre-drive position.
Figure 7:
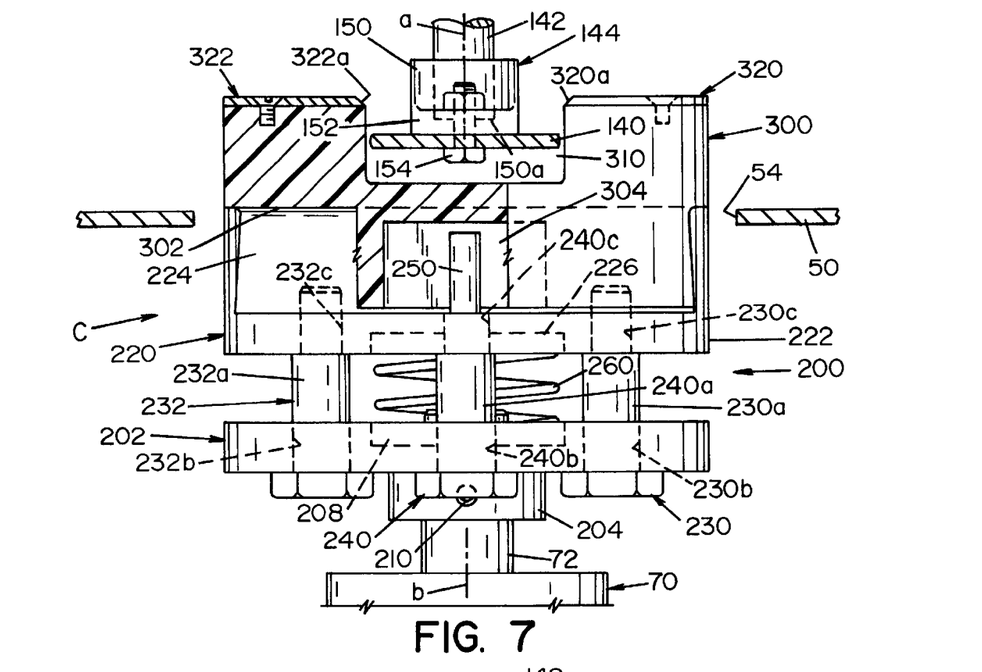
FIG. 7 is a view similar to FIG. 6 with the cutter blade in the drive position.
Figure 8:
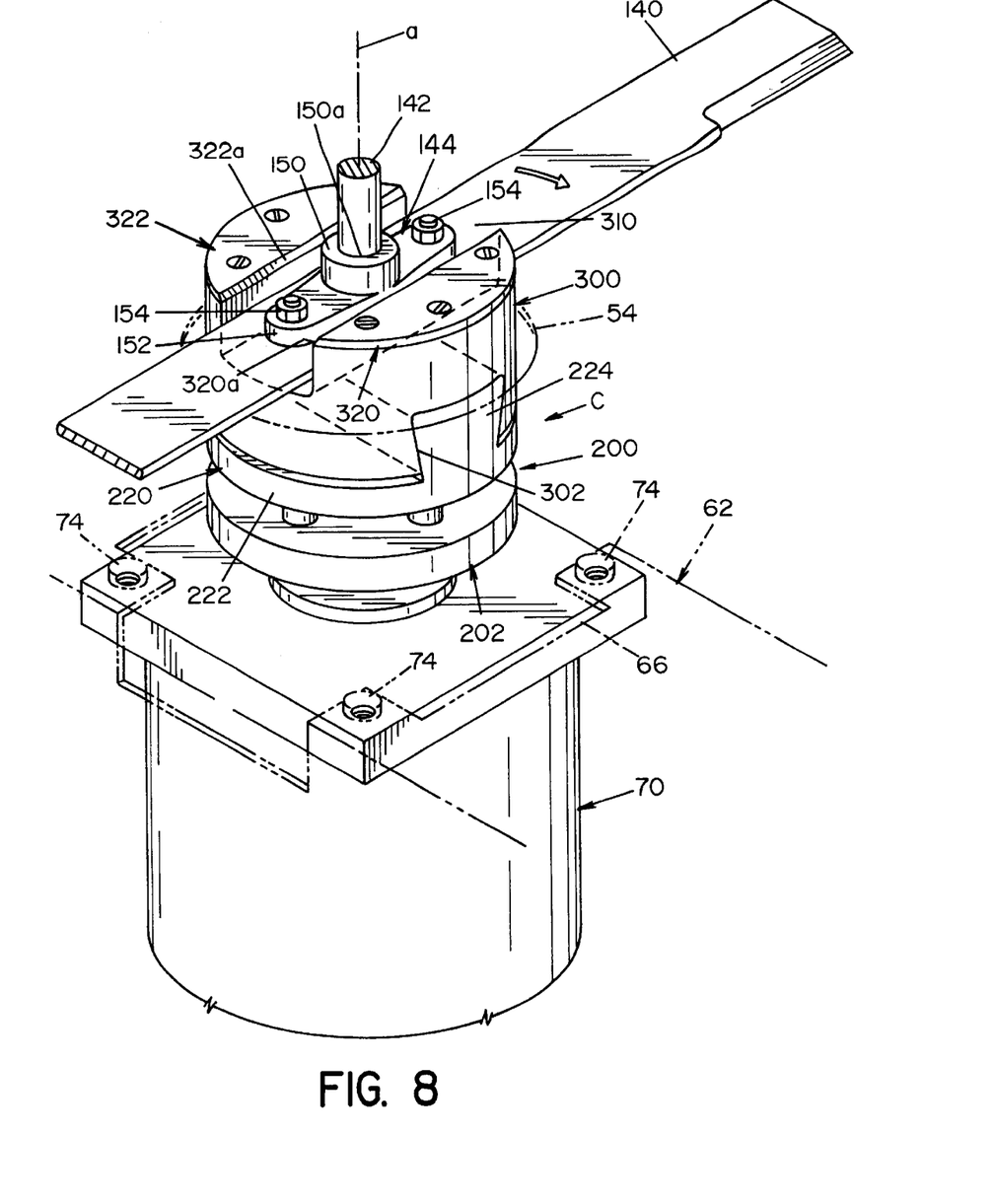
FIG. 8 is a pictorial view of the generator and coupling of the preferred embodiment of the present invention with the cutter blade in the driving position.
Figure 9:
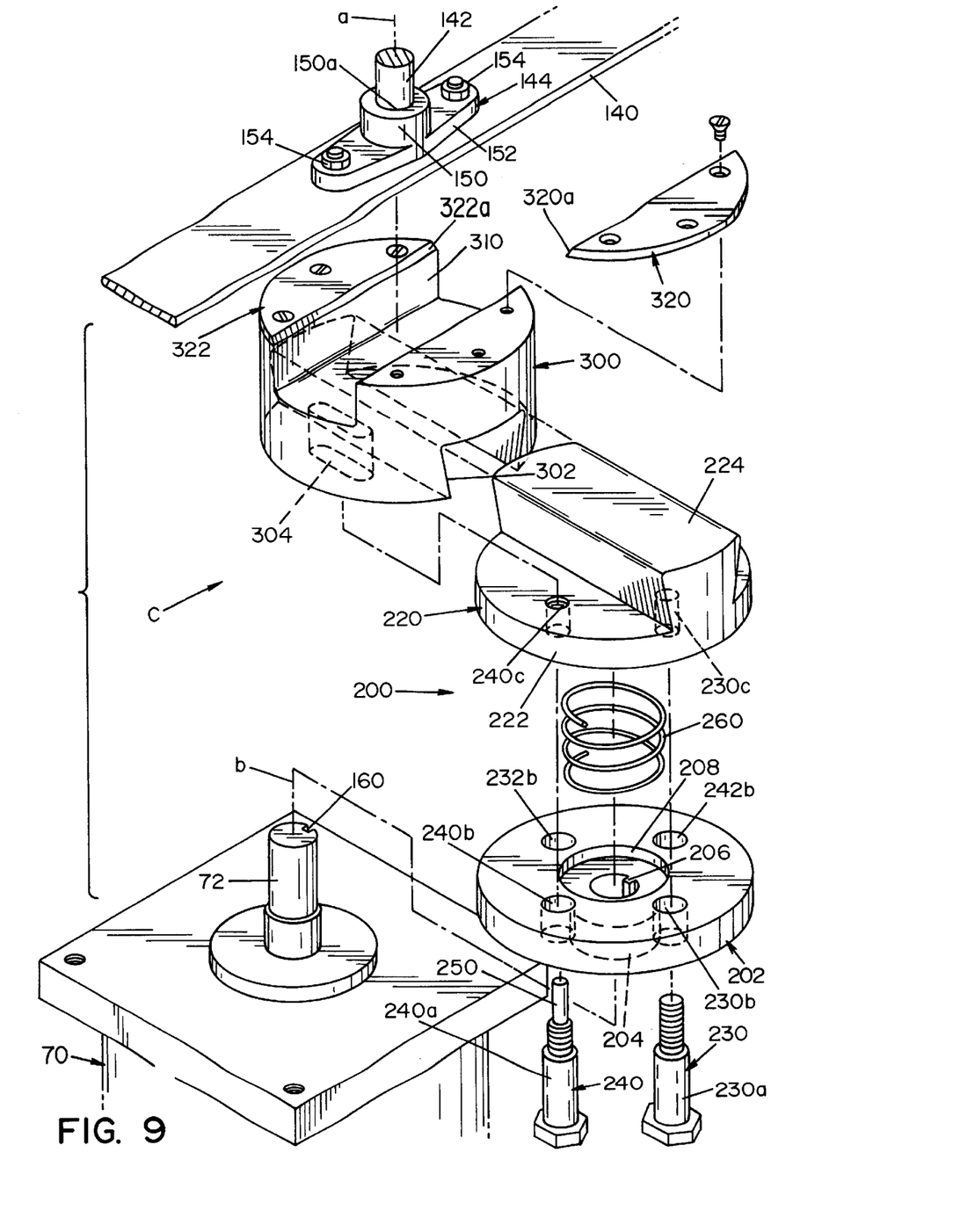
FIG. 9 is an exploded view of the elements shown in FIG. 8.

Coupling C includes the lower section 200 drivingly connected to shaft 72 of generator 70. In a like manner, the coupling includes an upper section 300 formed of a slidable plastic, in practice Delrin, and having a dovetail groove 302 that receives dovetail steel way 224. Guide slots 304, 306 receive guide pins 250, 252, respectively to limit movement of upper section 300 with respect to movable ring 220. Thus, pins 250, 252 capture upper section 300 to prevent disengagement by over travel. The length of slots 304, 306 is such to accommodate any misalignment of axes a, b when lawn mower 100 is mounted on implement 10. An upwardly facing nest in the formal slot 310 receives blade 140, as best shown in FIGS. 4 and 8. Section 300 has an upper circular surface bisected by nest or slot 310. The remaining portions of the surface include hardened steel wear plate 320, 322 having beveled edges 320a, 322a. The operation of the invention shown in FIG. 1 involves coupling C, as best shown in FIGS. 6 and 7. Lawn mower 100 is placed over platform 60 and is centered by appropriately positioned bumpers 160. Then the lawn mower is strapped onto the platform of implement 10. If blade 140 is not oriented to be aligned with nest or slot 310, the blade pushes upper section 300 toward lower section 200 against the action of spring 260. This is illustrated in FIG. 6 wherein bolts 154 engage the upper wear steel plates 320, 322. By pulling cord 132 without closing the start switch of the lawn mower, blade 140 rotates on the top of wear plates 320, 322. This then allows blade 140 to drop into slot 310 over beveled edges 320a, 322a as shown in FIG. 7. Then lawn mower 100 is started and coupling C drives generator shaft 72 for creating electrical power at outlets 12, 14 as shown in FIG. 1.

Figure 12:
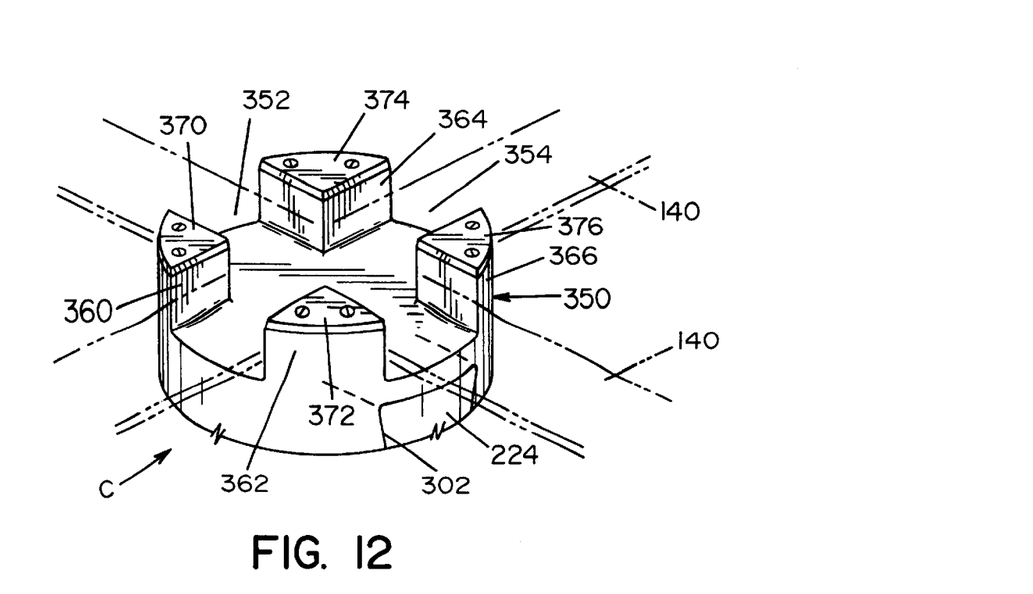
FIG. 12 is a pictorial view of the upper section of an alternative universal coupling; and, FIG. 13 is a pictorial view of still a further embodiment of the upper section of the universal coupling which is used without a spring bias.
Figure 13:
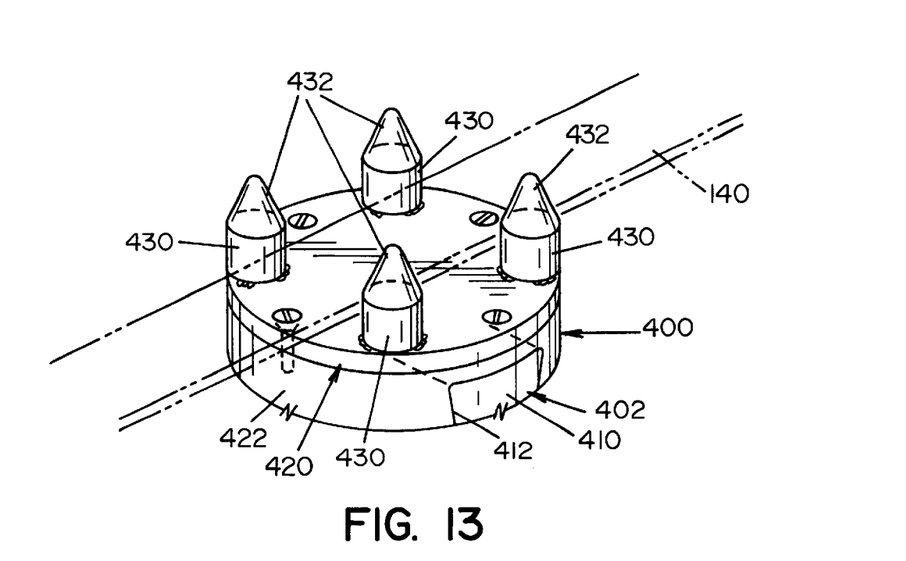

An alternative coupling is shown in FIG. 12. Upper section 350 of Delrin rides on steel dovetail way 224 by a groove 302 as previously explained. Section 350 is modified to include two diametrically extending nests or slots 352, 354 that define upstanding pillars or abutment elements 360, 362, 364 and 366. Each element has an upper metal wear plate 370, 372, 374 and 376, respectively. By using upper section 350, the orientation of the blade with respect to coupling C is less critical. Indeed, when using section 350, it is possible to make the lower section 200 fixed, without spring 260. This would be just a standard oldham coupling. Extending this concept further, FIG. 13 shows upper section 400 which is used with a fixed lower section 402 having no spring action. Way 410 of lower section 402 rides in groove 412. These two sections include guide pins and slots to control over travel of the two sections with respect to each other. Lower section 402 is connected to shaft 72 as fixed drive ring 202 in the embodiment shown in FIGS. 5–9. Section 400 includes an upper metal plate 420 bolted onto Delrin body portion 422 and including upstanding pegs 430 having cone-shaped tops 432. The orientation of blade 140 is generally irrelevant. Blade 140 is captured by pegs 430 as lawn mower 100 is placed on the top of platform 60. In this embodiment, it is not necessary to provide a spring action for the universal coupling.

Having thus defined the invention, the following is claimed:

1. A portable implement for providing a source of electrical energy, said implement having an electric generator with a drive shaft rotatable about a shaft axis and at least one set of electrical output leads, a support housing with a lower ground engaging base, an upper support plate with a central access opening, a bracket in said housing to mount said generator with said shaft axis extending generally vertically through said access opening, a platform on said housing to fixedly attach a standard gasoline driven lawn mower with a cutter blade rotatable about a blade axis onto said housing with said blade axis extending generally parallel to and generally aligned with said shaft axis and a universal shaft coupling carried by said drive shaft and extending through said access opening, said coupling having a lower section connected to said drive shaft for rotation about said shaft axis and an upper section with a nest to receive said cutter blade for rotation of said upper section about said blade axis.

2. A portable implement as defined in claim 1 wherein said universal coupling has a guide way to allow sliding orthogonal movement between said upper and lower sections.

3. A portable implement as defined in claim 2 wherein said universal coupling is an oldham coupling.

4. A portable implement as defined in claim 1 wherein said universal coupling is an oldham coupling.

5. A portable implement as defined in claim 4 wherein said lawn mower has a blade encircling cowling with a given outer periphery and said plate form includes at least four cowling engaging bumpers positioned to center said lawn mower blade over said generator shaft.

6. A portable implement as defined in claim 5 wherein at least two or said bumpers are adjustable in a direction toward and away from said cowling when said lawn mower is on said plate form.

7. A portable implement as defined in claim 6 wherein each of said bumpers is mounted on a pivoted plate, a bolt between said pivoted plate and said plate form and an elongated hole in said pivoted plate and around said bolt to allow movement of said bumper toward and away from said cowling, whereby said bolt locks said bumper in the desired position with respect to said cowling.

8. A portable implement as defined in claim 5 wherein each of said bumpers is mounted on a pivoted plate, a bolt between said pivoted plate and said plate form and an elongated hole in said pivoted plate and around said bolt to allow movement of said bumper toward and away from said cowling, whereby said bolt locks said bumper in the desired position with respect to said cowling.

9. A portable implement as defined in claim 1 wherein said lawn mower has a blade encircling cowling with a given outer periphery and said plate form includes at least four cowling engaging bumpers positioned to center said lawn mower blade over said generator shaft.

10. A portable implement as defined in claim 9 wherein at least two or said bumpers are adjustable in a direction toward and away from said cowling when said lawn mower is on said plate form.

11. A portable implement as defined in claim 10 wherein each of said bumpers is mounted on a pivoted plate, a bolt between said pivoted plate and said plate form and an elongated hole in said pivoted plate and around said bolt to allow movement of said bumper toward and away from said cowling, whereby said bolt locks said bumper in the desired position with respect to said cowling.

12. A portable implement as defined in claim 9 wherein each of said bumpers is mounted on a pivoted plate, a bolt between said pivoted plate and said plate form and an elongated hole in said pivoted plate and around said bolt to allow movement of said bumper toward and away from said cowling, whereby said bolt locks said bumper in the desired position with respect to said cowling.

13. A portable implement as defined in claim 9 wherein said upper section is spring biased with respect to said lower section whereby said blade forces said upper section toward said lower section until said blade is in said slot.

14. A portable implement as defined in claim 4 wherein said upper section is spring biased with respect to said lower section whereby said blade forces said upper section toward said lower section until said blade is in said slot.

15. A portable implement as defined in claim 2 wherein said upper section is spring biased with respect to said lower section whereby said blade forces said upper section toward said lower section until said blade is in said slot.

16. A portable implement as defined in claim 1 wherein said upper section is spring biased with respect to said lower section whereby said blade forces said upper section toward said lower section until said blade is in said slot.

17. A portable implement as defined in claim 16 wherein said nest is an elongated slot and said upper section has a generally flat surface surrounding said slot and a metal wear plate on said surface allowing said blade to rotate on said upper section until it engages said slot.

18. A portable implement as defined in claim 17 wherein said upper section includes two orthogonal slots.

19. A portable implement as defined in claim 9 wherein said nest is an elongated slot and said upper section has a generally flat surface surrounding said slot and a metal wear plate on said surface allowing said blade to rotate on said upper section until it engages said slot.

20. A portable implement as defined in claim 4 wherein said nest is an elongated slot and said upper section has a generally flat surface surrounding said slot and a metal wear plate on said surface allowing said blade to rotate on said upper section until it engages said slot.

21. A portable implement as defined in claim 2 wherein said nest is an elongated slot and said upper section has a generally flat surface surrounding said slot and a metal wear plate on said surface allowing said blade to rotate on said upper section until it engages said slot.

22. A portable implement as defined in claim 1 wherein said nest is an elongated slot and said upper section has a generally flat surface surrounding said slot and a metal wear plate on said surface allowing said blade to rotate on said upper section until it engages said slot.

23. A method of driving an electric generator by a drive shaft having an upstanding coupling with an upper section in the form of a circular disk provided with at least one diametrically extending blade receiving slot, said upper section spring biased in the direction of said shaft, said method comprising:

(a) providing a standard lawn mower with a lower cutter blade and driven by a gasoline engine started by a pull cord when a start switch is closed;

(b) setting said lawn mower on said generator with said cutter blade engaging and pushing said upper section downward;

(c) pulling said pull cord at least once with said switch opened whereby said blade drops into said slot; and, (d) closing said switch and pulling said cord to start said engine for driving said generator.

24. A portable generator for providing a source of electric energy, said generator having an upstanding drive shaft with a universal coupling having an upper section with upwardly facing cutter blade receiving nest and a lower section rotatably secured to said drive shaft whereby a gasoline driven lawn mower can be mounted on said coupling with said blade of said lawn mower drivingly engaging said nest.

25. A portable generator as defined in claim 24 wherein said nest is a diametrically extended slot.

26. A portable implement as defined in claim 25 wherein said upper section is spring biased with respect to said lower section whereby said blade forces said upper section toward said lower section until said blade is in said slot.

27. A portable implement as defined in claim 24 wherein said upper section is spring biased with respect to said lower section whereby said blade forces said upper section toward said lower section until said blade is in said nest.

28. A portable implement as defined in claim 24 wherein said universal coupling has a guide way to allow sliding orthogonal movement between said upper and lower sections.

29. A portable implement as defined in claim 28 wherein said upper section is spring biased with respect to said lower section whereby said blade forces said upper section toward said lower section until said blade is in said nest.

30. A portable implement as defined in claim 24 wherein said nest is an elongated slot and said upper section has a generally flat surface surrounding said slot and a metal wear plate on said surface allowing said blade to rotate on said upper section until it engages said slot.

31. A portable implement as defined in claim 30 wherein said upper section is spring biased with respect to said lower section whereby said blade forces said upper section toward said lower section until said blade is in said slot.

* * * * *